(12) United States Patent
Yoo

(10) Patent No.: US 10,975,622 B2
(45) Date of Patent: Apr. 13, 2021

(54) LADDER

(71) Applicant: Thomas Yoo, Garden Grove, CA (US)

(72) Inventor: Thomas Yoo, Garden Grove, CA (US)

(73) Assignees: Thomas Yoo, Garden Grove, CA (US); HYUNDAI ALUMINUM VINA SHAREHOLDING COMPANY, Hung (VN)

( * ) Notice: Subject to any disclaimer, the term of this patent is extended or adjusted under 35 U.S.C. 154(b) by 80 days.

(21) Appl. No.: 16/010,918

(22) Filed: Jun. 18, 2018

(65) Prior Publication Data

US 2019/0383100 A1  Dec. 19, 2019

(51) Int. Cl.
*E06C 7/06* (2006.01)
*F16B 7/10* (2006.01)
*E06C 1/18* (2006.01)

(52) U.S. Cl.
CPC .............. *E06C 7/06* (2013.01); *E06C 1/18* (2013.01); *F16B 7/105* (2013.01)

(58) Field of Classification Search
CPC ............... E06C 7/06; E06C 1/19; F16B 7/105
See application file for complete search history.

(56) References Cited

U.S. PATENT DOCUMENTS

| | | | | |
|---|---|---|---|---|
| 118,253 A | * | 8/1871 | Lull | F16B 7/105 403/105 |
| 452,321 A | * | 5/1891 | Scott | F16B 7/105 403/108 |
| 1,218,021 A | * | 3/1917 | Waither | F16H 55/283 74/422 |
| 4,457,391 A | * | 7/1984 | Alimbau Marques | E06C 1/52 182/164 |
| 4,574,918 A | * | 3/1986 | Marques | E06C 1/52 182/164 |
| 6,837,642 B1 | * | 1/2005 | Lin | F16B 7/105 403/109.1 |
| 8,162,280 B2 | * | 4/2012 | Yu | F16M 11/06 248/354.7 |

(Continued)

OTHER PUBLICATIONS https://register.epo.org/documentView?number=KR.19990013274.A&documentId=Application_111999003447413 (Year: 2019).*
KR 2000066283 Hwang (Year: 2000).*

*Primary Examiner* — Colleen M Chavchavadze
*Assistant Examiner* — Candace L Bradford
(74) *Attorney, Agent, or Firm* — John K. Park; Park Law Firm

(57) ABSTRACT

A rung lock assembly is provided for a ladder, and comprises rung lock portions, a pinion gear, compression springs, a rung body, a rung cover, a center bolt, a spacer, and a fastener portion. Each of the rung lock portions comprises a rod portion, a rack block fixed to the rod portion, a locking portion, a holding portion connecting the rod portion to the locking portion so that the rod portion is disposed in parallel with the locking portion and configured to be held and pulled by a user's hand, and the rung lock portions are anchored by guide plates and disposed in parallel with each other. The pinion gear is disposed between and engaging the rack blocks, so that the rung lock portions translate outwards or inwards together. The distance between the locking portion is increased in both directions simultaneously by pulling one of the holding portions.

6 Claims, 19 Drawing Sheets

(56) References Cited

U.S. PATENT DOCUMENTS

| | | | |
|---|---|---|---|
| 2005/0274571 A1* | 12/2005 | Simpson | E06C 7/083 182/23 |
| 2015/0047927 A1* | 2/2015 | Nodarse | E06C 1/12 182/209 |
| 2017/0254145 A1* | 9/2017 | Ballard | E06C 7/06 |

* cited by examiner

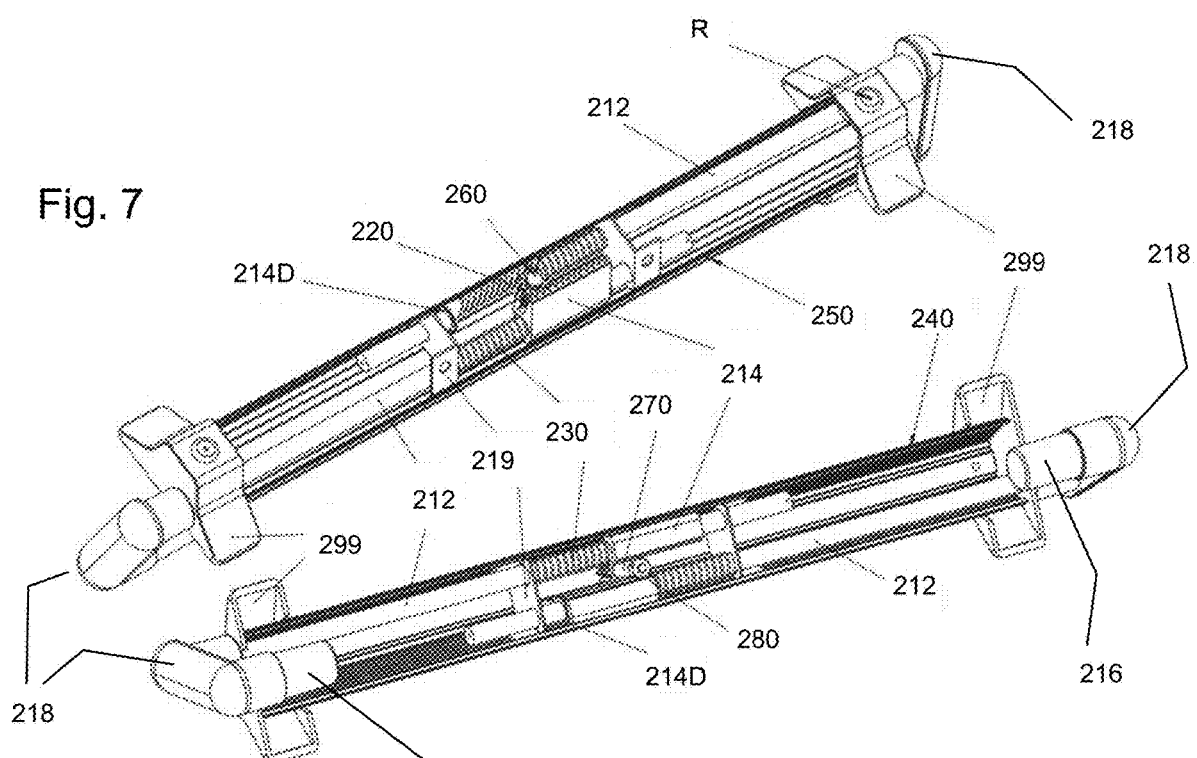

Fig. 20
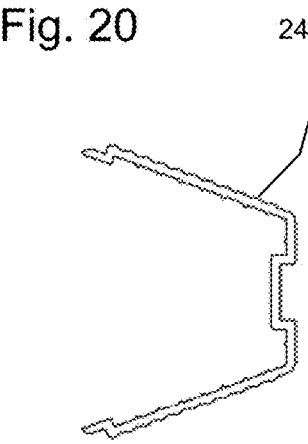
240
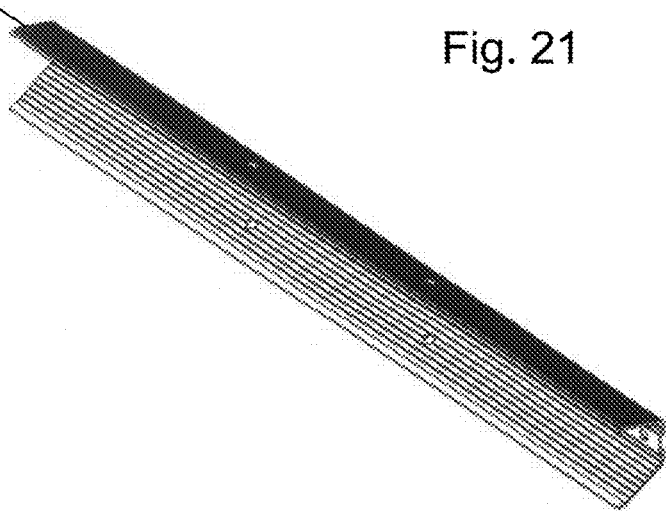
Fig. 21
Fig. 22
250
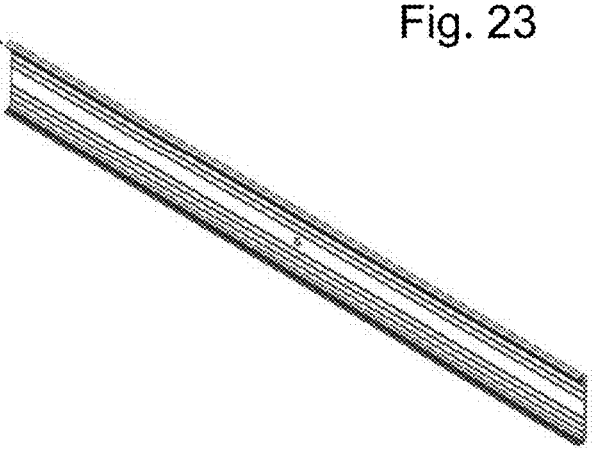
Fig. 23

Fig. 24
Fig. 25
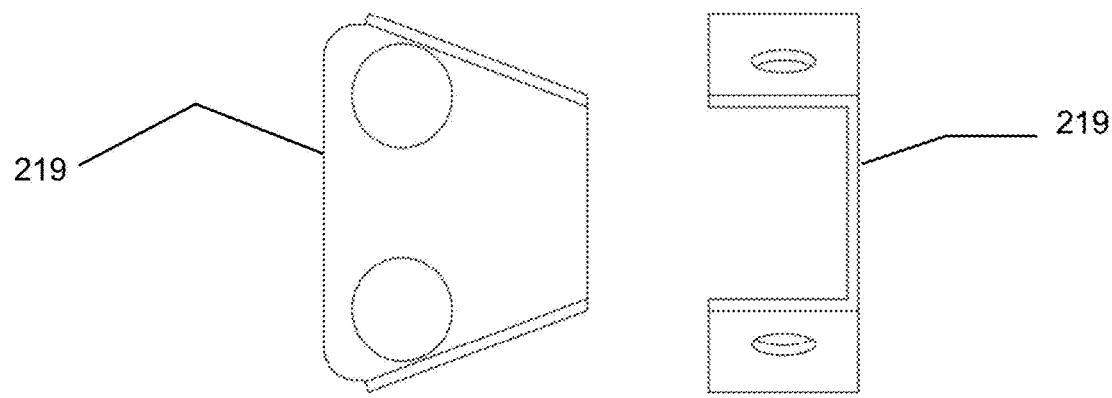
Fig. 26
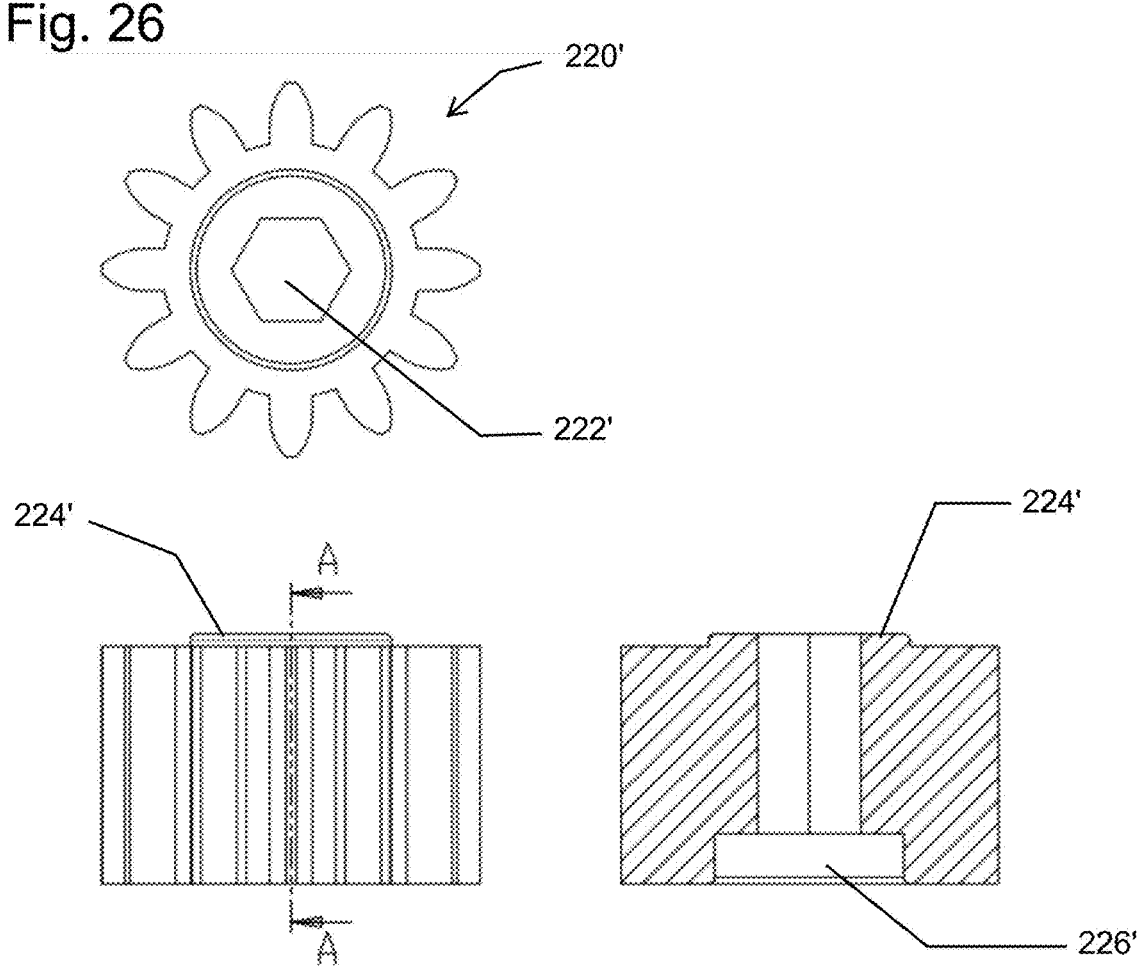
Fig. 27
Fig. 28

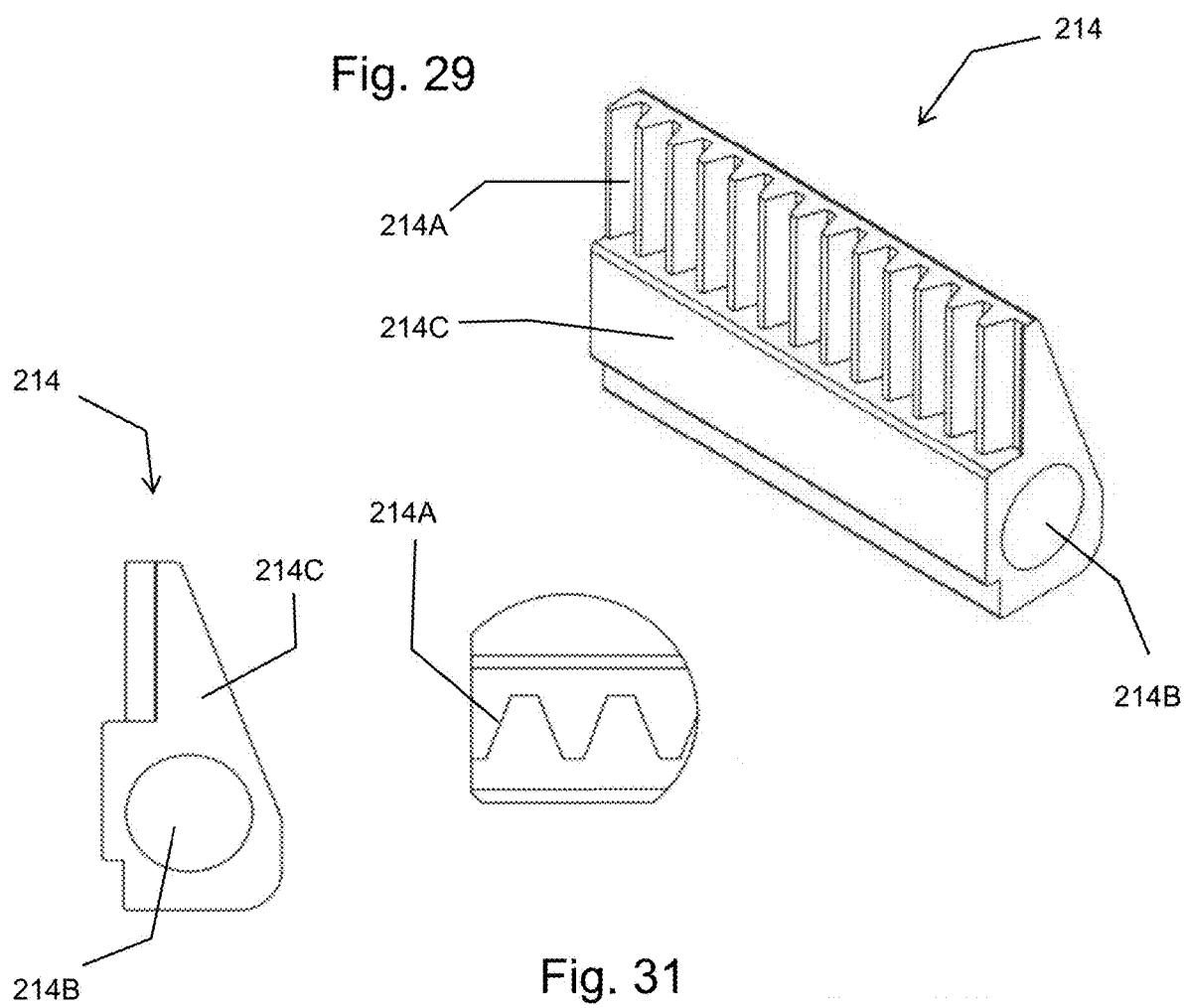

Fig. 34
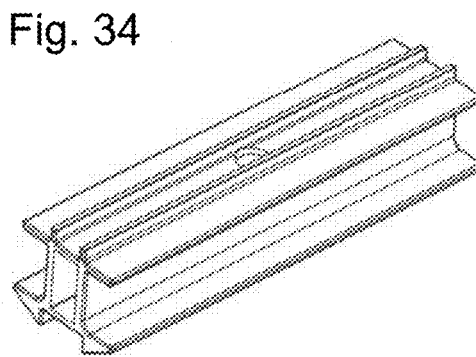
290
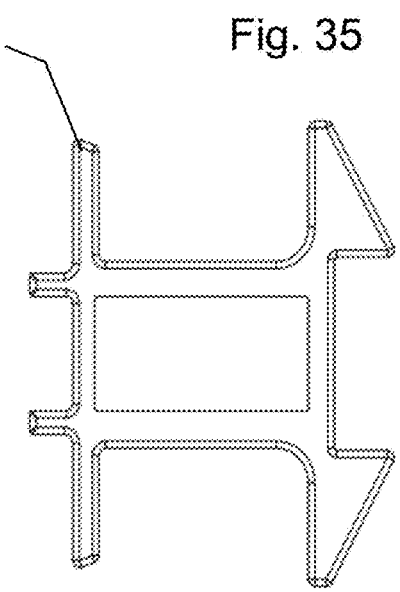
Fig. 35
Fig. 36
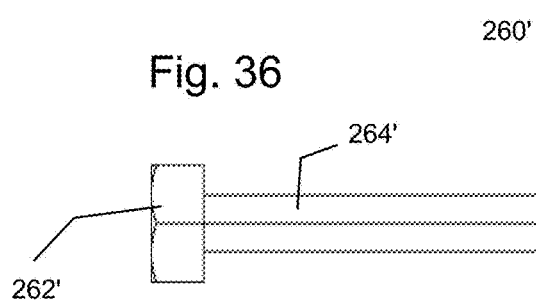
260'
268'
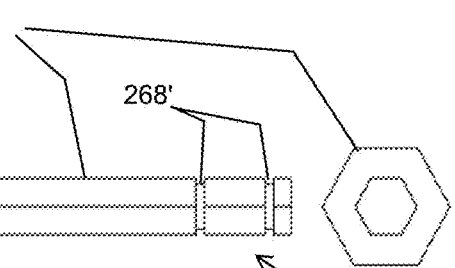
Fig. 37
266'
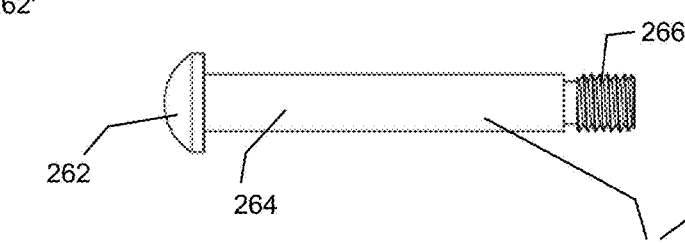
266
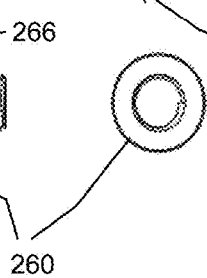
Fig. 39
260
Fig. 38

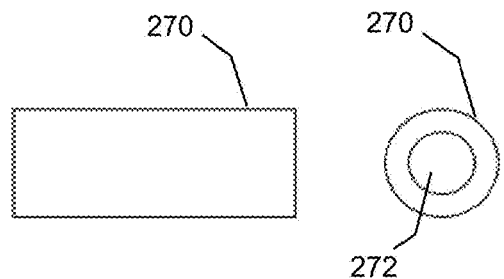
Fig. 40  Fig. 41
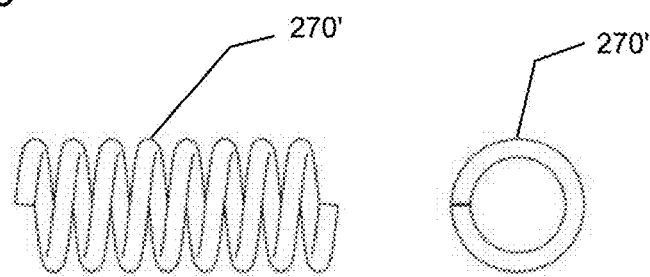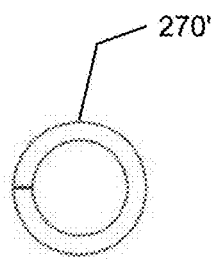
Fig. 42  Fig. 43
Fig. 44
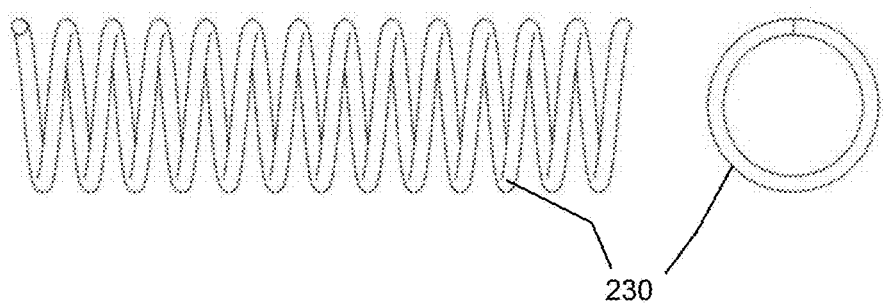
Fig. 45
Fig. 46
Fig. 47
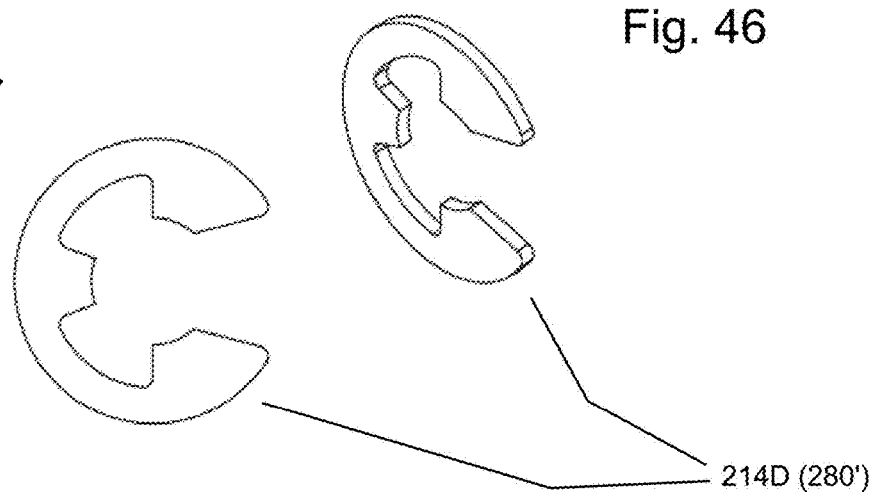

LADDER

BACKGROUND OF THE INVENTION

The present invention relates to a ladder.

The ladder is an indispensable tool in many fields of industries. Such necessities can be seen clearly from the long history of ladders.

Even though it has such a long history, the conventional ladders still need improvements.

Accordingly, a need for an advanced ladder has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a ladder.

An aspect of the invention provides a ladder comprising a pair of front side rails, a pair of rear side rails, a plurality of front fixed rung portions, a plurality of rear fixed rung portions, and a front rung lock assembly.

The pair of front side rails comprise top portions and bottom portions, and corresponding top and bottom portions are slidably connected in a telescopic manner.

The pair of rear side rails comprise top portions and bottom portions, and corresponding top and bottom portions are slidably connected in a telescopic manner.

The plurality of front fixed rung portions are disposed between the pair of front side rails, and the plurality of rear fixed rung portions are disposed between the pair of rear side rails.

The rung lock assembly (also referred to as "rung-lock assembly") is disposed at telescopic connecting portions provided between the top portions and the bottom portions of the pair of front side rails or of the pair of rear side rails, and configured to lock the top portions and the bottom portions through through-holes provided through the telescopic connecting portions.

The top portions of the pair of front side rails are rotatably connected with the top portions of the pair of rear side portions through a pair of hinges.

The front rung lock assembly comprises a pair of rung lock portions (also referred to as "rung-lock portions"), a pinion gear, a pair of compression springs, a rung body, a rung cover, a center bolt, a spacer, and a fastener portion.

Each of the pair of rung lock portions comprises a rod portion, a rack block fixed to the rod portion, a locking portion, a holding portion connecting the rod portion to the locking portion so that the rod portion is disposed in parallel with the locking portion and configured to be held and pulled by a user's hand, and the pair of rung lock portions are anchored by a pair of guide plates and disposed in parallel with each other.

The pinion gear is disposed between and engaging the pair of rack blocks facing each other, so that the pair of rung lock portions translate outwards or inwards together.

Each of the pair of compression springs is installed around a corresponding rod portion between the rack block and the guide plate.

The rung body has a U-shaped cross-section and enclosing the pair of rung lock portions and the pinion gear and configured for the pair of the guide plates to be fixed to the rung body.

The rung cover has a planar shape and configured to cover an open end portion of the rung body.

The center bolt is queued through the rung body and the rung cover and rotatably supporting the pinion gear.

The spacer has a tube shape and configured to be queued by the center bolt and support and maintain the pinion gear in place in a direction of length of the center bolt.

The fastener portion is configured to fix the center bolt from outside of the rung cover.

The rung lock assembly is configured so that a distance between the pair of locking portion is increased in both directions simultaneously by pulling one of the holding portions of the pair of rung lock portions.

The holding portion of the rung lock portion may be configured to be twisted about the rod portion.

The rung lock portion may be configured to be pulled by a specific distance determined by a distance between the pair of guide plates and distances between each edge of the rack block and the neighboring guide plate.

Each of the rack blocks may comprise a rack gear portion and a rod-hole portion.

The rack gear portion may be provided on a top side wall of a base body, and configured to engage with the pinion gear, and the rod-hole portion may be provided through a lower portion in a direction of a train of the rack gear portion, and configured so that the rod portion of the rung lock portion is queued and fixed therethrough.

The rack block may be fixed to the rod portion of the rung lock portion by installing a retaining ring in a groove provided at the rod portion.

The center bolt may comprise a head portion, a shaft portion, and a fastening portion.

The shaft portion may extend from the head portion and be configured to be queued and fixed through a center through-hole of the pinion gear.

The fastening portion may be provided at an end of the shaft portion and configured to engage the fastener portion.

The shaft portion may have a circular cross-section, and is configured to be queued through the center through-hole of the pinion gear, so that the pinion gear rotates about the shaft portion, wherein the spacer has a corresponding center through-hole corresponding to the cross-section of the shaft portion.

The fastener portion may comprise a nut configured to engage a fastening portion of the center bolt.

The ladder may further comprise a rung lock handle disposed on an exterior wall of the rung body and having a through-hole for the center bolt.

The shaft portion may have a cross-section of a polygon, and the polygon may comprise hexagon, and wherein the center through-hole of the pinion gear has the same cross-section as the shaft portion so that the shaft portion is queued through the center through-hole.

The spacer may be a spring having a specific length and a specific spring constant, so as to support and maintain the pinion gear in place.

The pinion gear may further comprise a circular protrusion formed around the center through-hole on a first end portion of the pinion gear, so as to minimize friction of the pinion gear against the rung body.

The pinion gear may further comprise an axial groove around a part of the center through-hole on a second end portion of the pinion gear, so as to receive one end of the spring.

The fastener portion may comprise a pair of retention rings disposed on both sides of the rung cover and configured to engage two grooves provided around an end portion of the center bolt.

The ladder may further comprise a rear rung lock assembly disposed at telescopic connecting portions provided between the top portions and the bottom portions of the pair of rear side rails, and configured to lock the top portions and the bottom portions through through-holes provided through the telescopic connecting portions.

The advantages of the present invention are: (1) the rung lock assembly according to the invention can be installed easily to the ladder; and (2) the rung lock assembly is very convenient to use so that it is possible to operate with a hand of user.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIGS. 7 and 8 are rung lock assembly with covers removed according to an embodiment of the invention.

FIG. 20 is a cross-sectional view of a rung body according to an embodiment of the invention.

FIG. 21 is a perspective view of a rung body according to an embodiment of the invention.

FIG. 22 is a cross-sectional view of a rung cover according to an embodiment of the invention.

FIG. 23 is a perspective view of a rung cover according to an embodiment of the invention.

FIG. 24 is a front plan view of a guide plate according to an embodiment of the invention.

FIG. 25 is a side plan view of the guide plate of FIG. 24.

FIG. 26 is a front plan view of a pinion gear according to an embodiment of the invention.

FIG. 27 is a side plan view of the pinion gear of FIG. 26.

FIG. 28 is a cross-sectional view of the pinion gear of FIG. 26 along a line A-A.

FIG. 29 is a perspective view of a rack block according to an embodiment of the invention.

FIG. 30 is a side plan view of the rack block of FIG. 29.

FIG. 31 is a partial top plan view of the rack block of FIG. 29.

FIG. 32 is a side plan view of a rung lock portion according to an embodiment of the invention.

FIG. 34 is a perspective view of a handle according to an embodiment of the invention.

FIG. 35 is a cross-sectional view of the handle of FIG. 34.

FIG. 36 is a side plan view of a center bolt according to an embodiment of the invention.

FIG. 37 is a rear plan view of the center bolt of FIG. 36.

FIG. 38 is a side plan view of a center rivet according to an embodiment of the invention.

FIG. 39 is a rear plan view of the center rivet of FIG. 38.

FIG. 40 is a side plan view of a spacer according to an embodiment of the invention.

FIG. 41 is a front plan view of the spacer of FIG. 40.

FIG. 42 is a side plan view of a spring according to an embodiment of the invention.

FIG. 43 is a front plan view of the spring of FIG. 42.

FIG. 44 is a side plan view of a compressing spring according to an embodiment of the invention.

FIG. 45 is a front plan view of the compression spring of FIG. 44.

FIG. 46 is a perspective view of a retaining ring according to an embodiment of the invention.

FIG. 47 is a front plan view of the retaining ring of FIG. 46.

DETAILED DESCRIPTION EMBODIMENTS OF THE INVENTION

Figure 1:
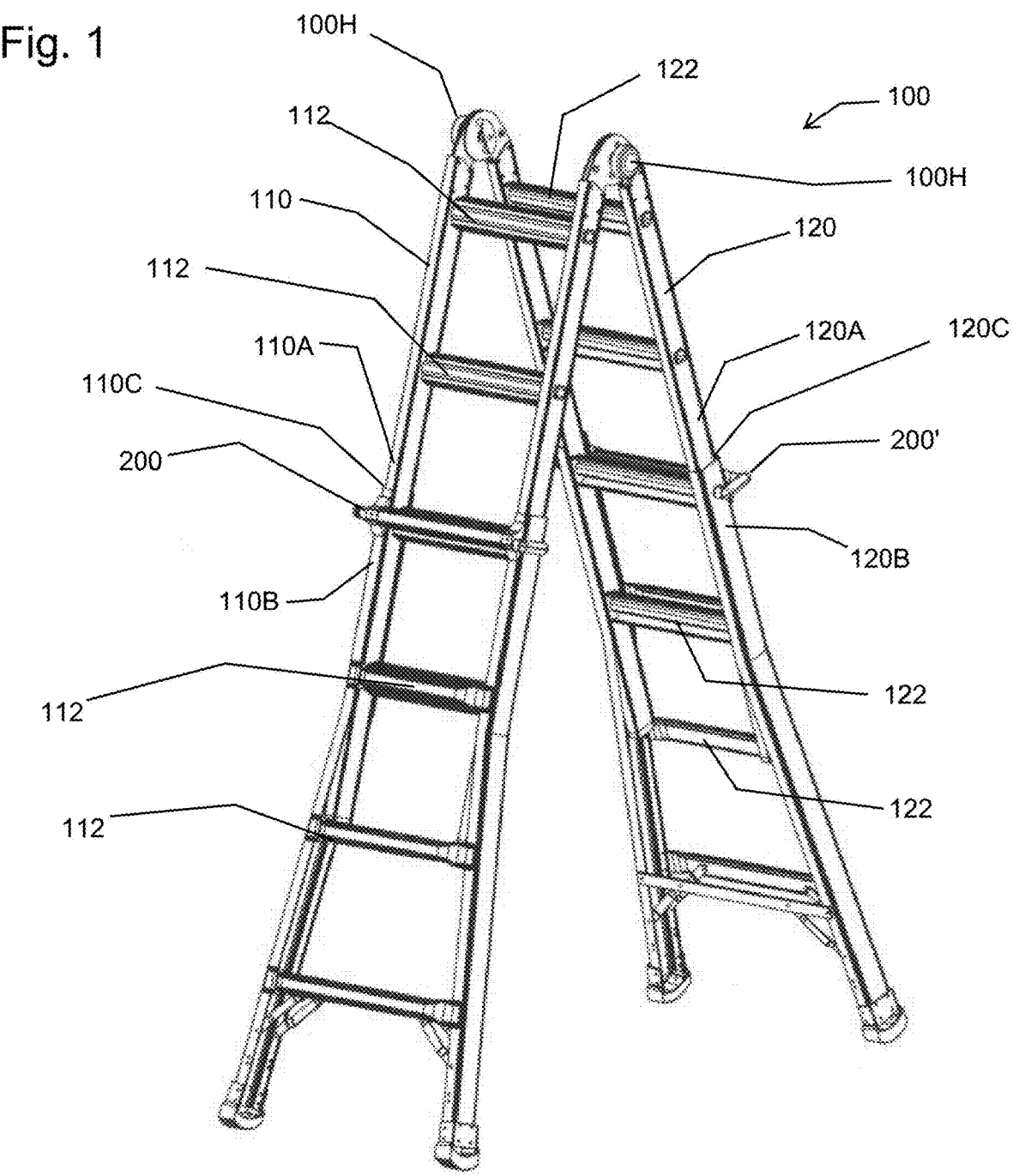
FIG. 1 is a perspective view showing a ladder with two rung lock assemblies according to an embodiment of the invention.
Figure 2:
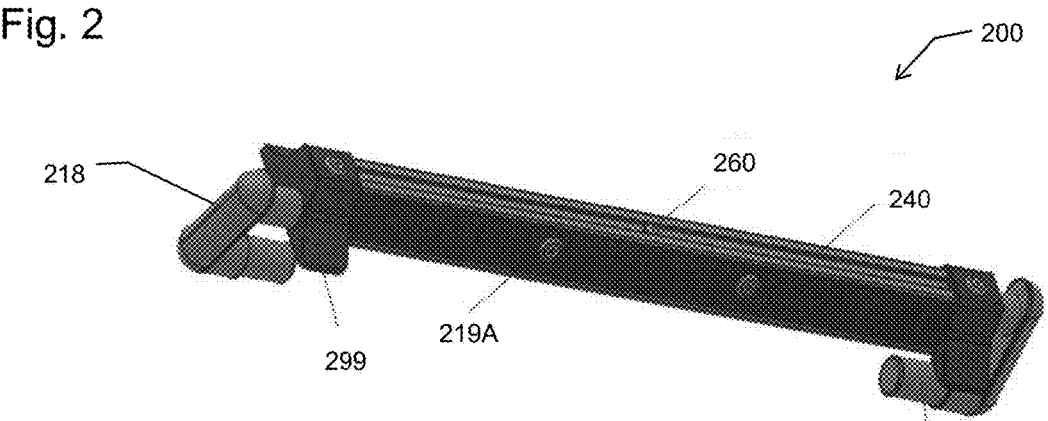
FIG. 2 is a perspective view showing a rung lock assembly according to an embodiment of the invention.

Referring to the figures, the embodiments of the invention are described in detail.

An aspect of the invention provides a ladder (100) comprising a pair of front side rails (110), a pair of rear side rails (120), a plurality of front fixed rung portions (112), a plurality of rear fixed rung portions (122), and a front rung lock assembly (200) as shown in FIGS. 1-47.

Actually, in the illustrated embodiment, the ladder (100) has exactly same front and rear rails. Therefore, all the components are shared by the front and rear rails.

The pair of front side rails (110) comprise top portions (110A) and bottom portions (110B), and corresponding top and bottom portions (110A, 110B) are slidably connected in a telescopic manner.

The pair of rear side rails (120) comprise top portions (120A) and bottom portions (120B), and corresponding top and bottom portions (120A, 120B) are slidably connected in a telescopic manner.

Therefore, each of the front and rear side rails (110, 120) are configured properly for such telescopic connections between the top portions (110A, 120A) and bottom portions (110B, 120B), respectively. That is, the top portion may include a plurality of through-holes along the side surface of the rail portions of the top portions (hidden and not shown) and the bottom portions may include one or more through-holes on the side surface of the rail portion of the bottom portions (110B, 120B). The size of through-holes in the top and bottom portions (110A, 110B, 120A, 120B) is determined to be queued by the size of the tip of rung lock portion (also referred to as "rung-lock portion") (see below).

The plurality of front fixed rung portions (112) are disposed between the pair of front side rails (110), and the plurality of rear fixed rung portions (122) are disposed between the pair of rear side rails (120).

The front rung lock assembly (200) is disposed at telescopic connecting portions (110C) provided between the top portions (110A) and the bottom portions (110B) of the pair of front side rails (110), and configured to lock the top portions (110A) and the bottom portions (110B) through through-holes provided through the telescopic connecting portions (110C) as shown in FIG. 1.

The top portions (110A) of the pair of front side rails (110) are rotatably connected with the top portions (120A) of the pair of rear side rails (120) through a pair of hinges (100H).

The front rung lock assembly (200) comprises a pair of rung lock portions (also referred to as "rung-lock portions") (210), a pinion gear (220), a pair of compression springs (230), a rung body (240), a rung cover (250), a center bolt (260), a spacer (270), and a fastener portion (280) as shown in FIGS. 2-9.

Each of the pair of rung lock portions (210) comprises a rod portion (212), a rack block (214) fixed to the rod portion (212), a locking portion (216), a holding portion (218) connecting the rod portion (212) to the locking portion (216) so that the rod portion (212) is disposed in parallel with the locking portion (216) and configured to be held and pulled by a user's hand, and the pair of rung lock portions (210) are anchored by a pair of guide plates (219) and disposed in parallel with each other.

The pinion gear (220) is disposed between and engaging the pair of rack blocks (214) facing each other, so that the pair of rung lock portions (210) translate outwards or inwards together at the same time as shown in FIGS. 14-15 and 18-19.

Each of the pair of compression springs (230) is installed around a corresponding rod portion (212) between the rack block (214) and the guide plate (219) as shown in FIGS. 14-15 and 18-19.

Figure 9:
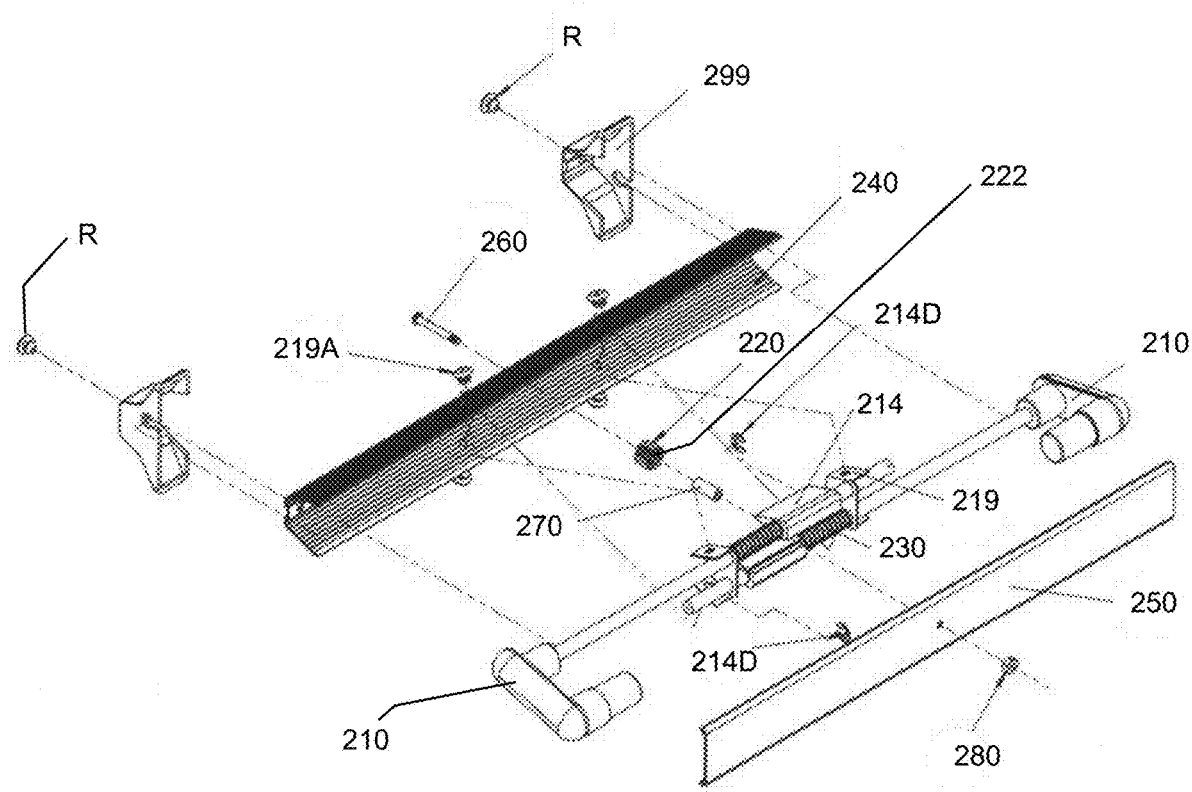
FIG. 9 is an exploded view of the rung lock assembly according to an embodiment of the invention.
Figure 10:
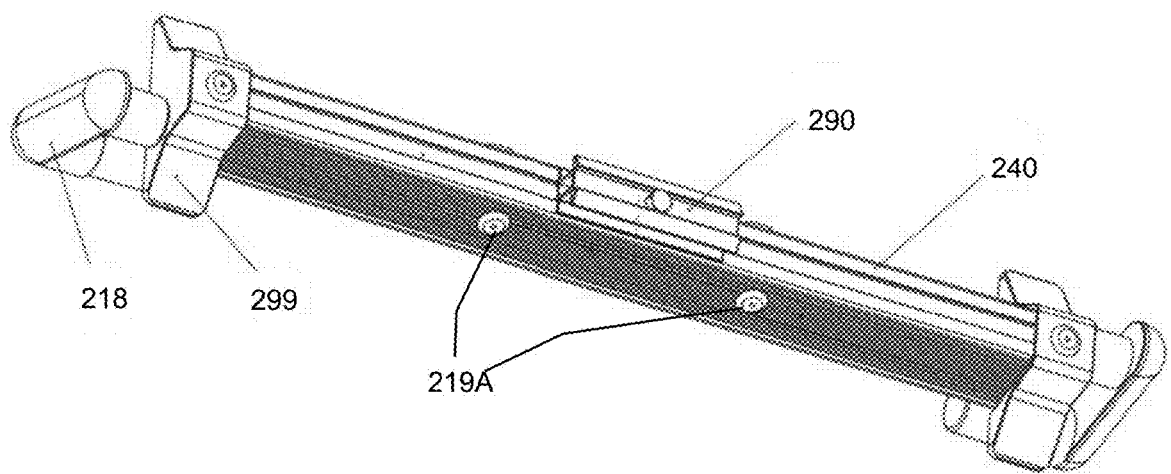
FIG. 10 is a perspective view showing a rung lock assembly with a handle according to another embodiment of the invention.
Figure 11:
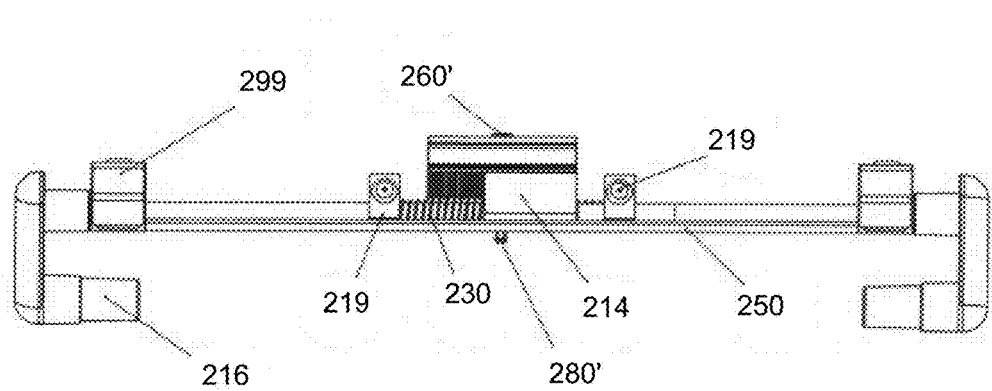
FIG. 11 is a side view showing a rung lock assembly with a rung body removed according to still another embodiment of the invention.

The rung body (also referred to as "rung-lock-assembly body") (240) has a U-shaped cross-section and encloses the pair of rung lock portions (210) and the pinion gear (220) and configured for the pair of the guide plates (219) to be fixed to the rung body (240) by blind rivets (219A) through a corresponding through-holes provided through the rung body (240) as shown in FIGS. 9 and 20-21, for an example.

The rung cover (also referred to as "rung-lock-assembly-end cover") (250) has a planar shape and configured to cover an open end portion of the rung body (240) as shown in FIGS. 22-23. The cross-sections of the rung cover (250) is configured to engage with the rung body (240) securely as shown in FIGS. 20 and 22.

The center bolt or center rivet (260) is queued through the rung body (240) and the rung cover (250) and rotatably supporting the pinion gear (220) as shown in FIGS. 7-9 and 13-15.

The spacer (270) has a tube shape and is configured to be queued by the center bolt or center rivet (260) and support and maintain the pinion gear (220) in place in a direction of length of the center bolt (260) as shown in FIG. 9, for an example.

The fastener portion (280) is configured to fix the center bolt (260) from outside of the rung cover (250) as shown in FIG. 9.

Figure 13:
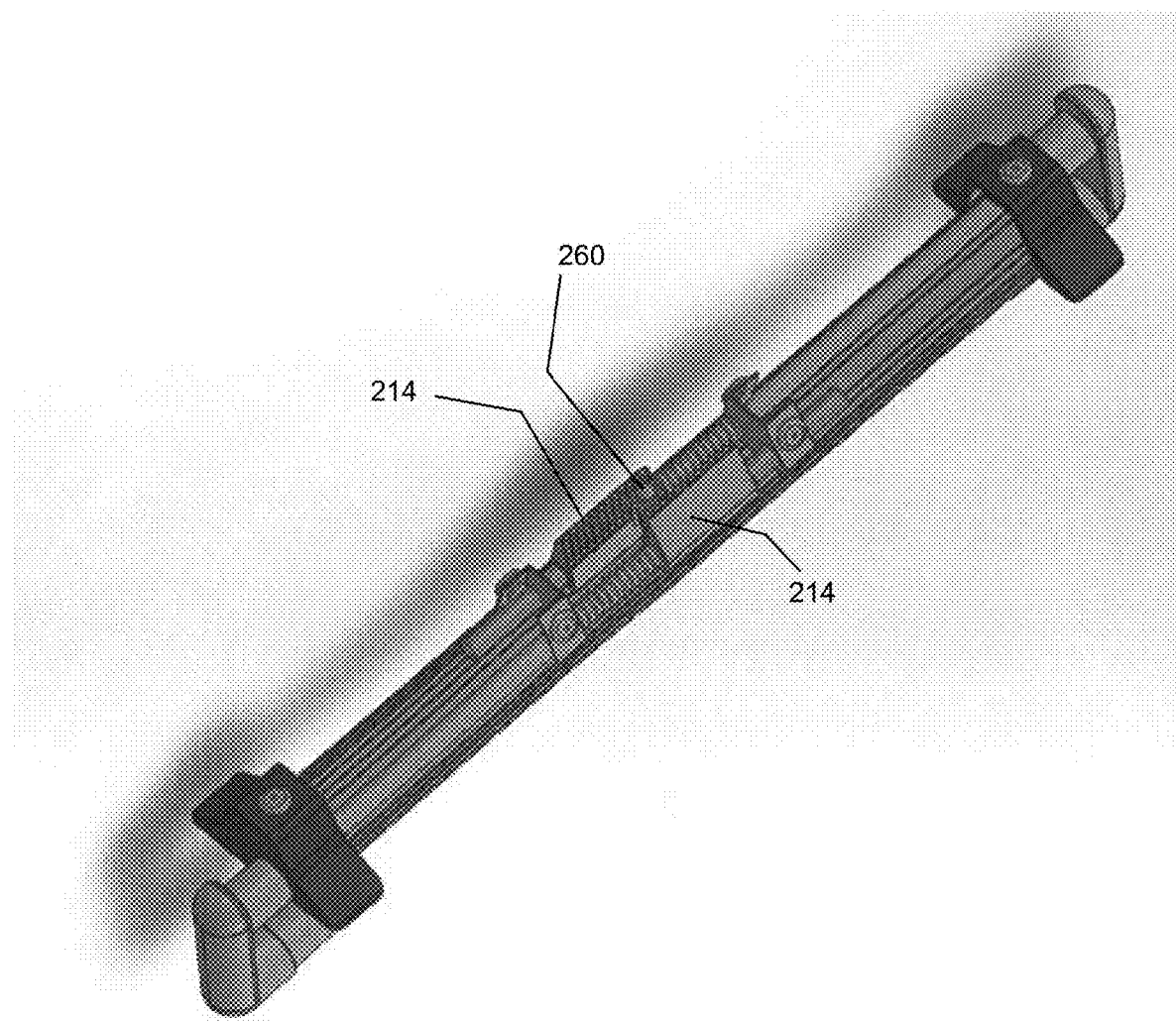
FIG. 13 is another perspective view of a rung lock assembly with a rung body removed according to an embodiment of the invention.
Figure 14:
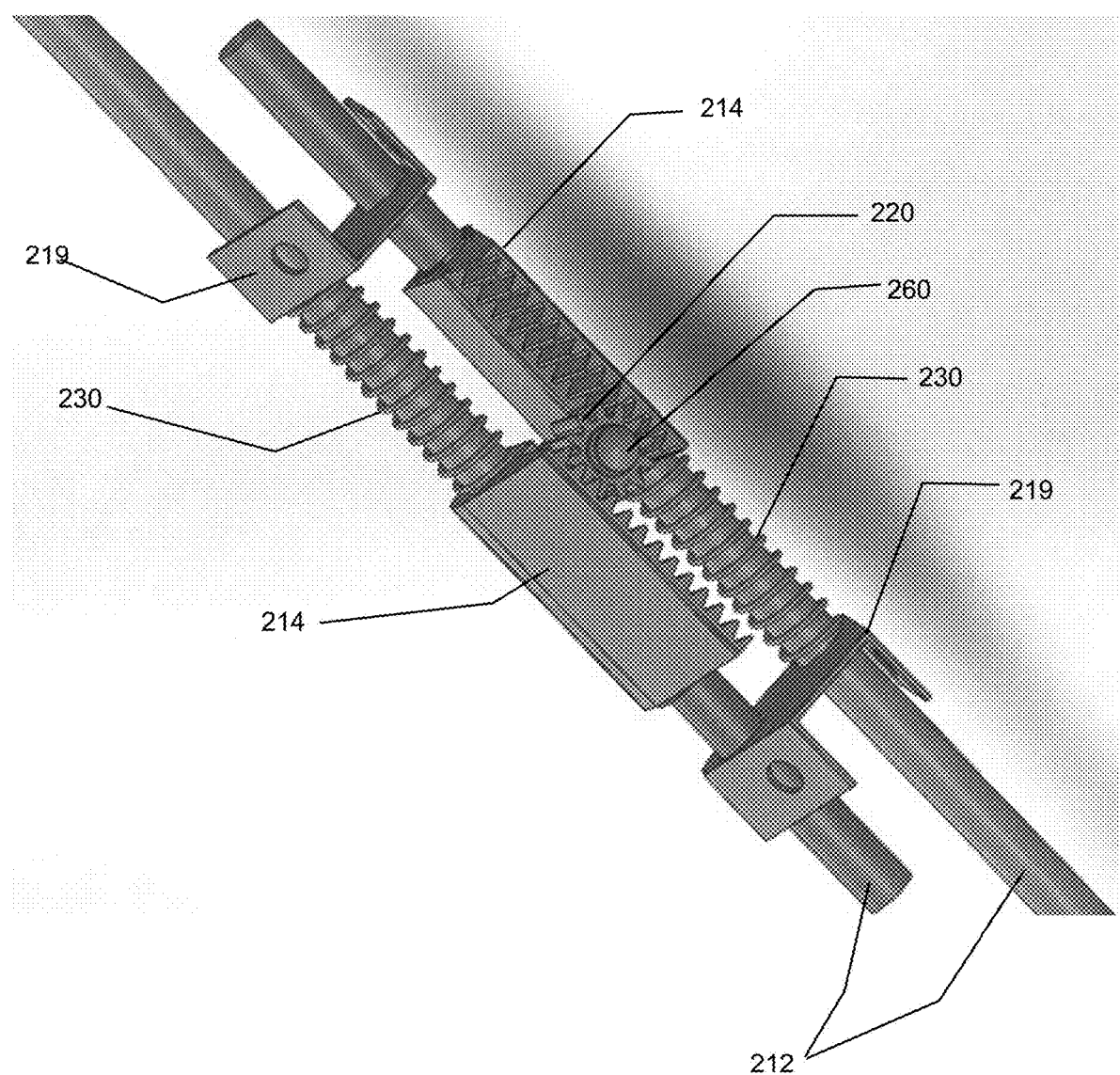
FIG. 14 is a partially enlarged top view showing two rung lock portions engaging each other through rock blocks, pinion gears, and compression springs according to an embodiment of the invention.
Figure 15:
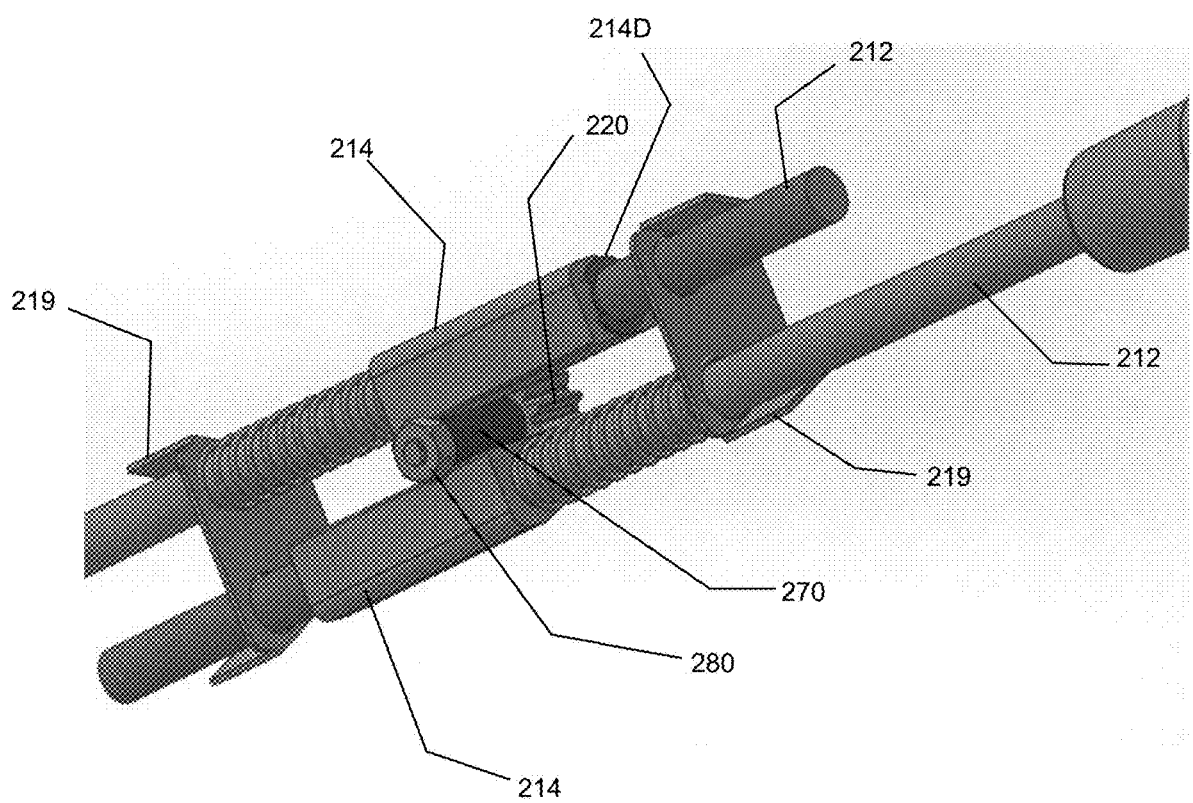
FIG. 15 is a partially enlarged bottom view of FIG. 14.
Figure 16:
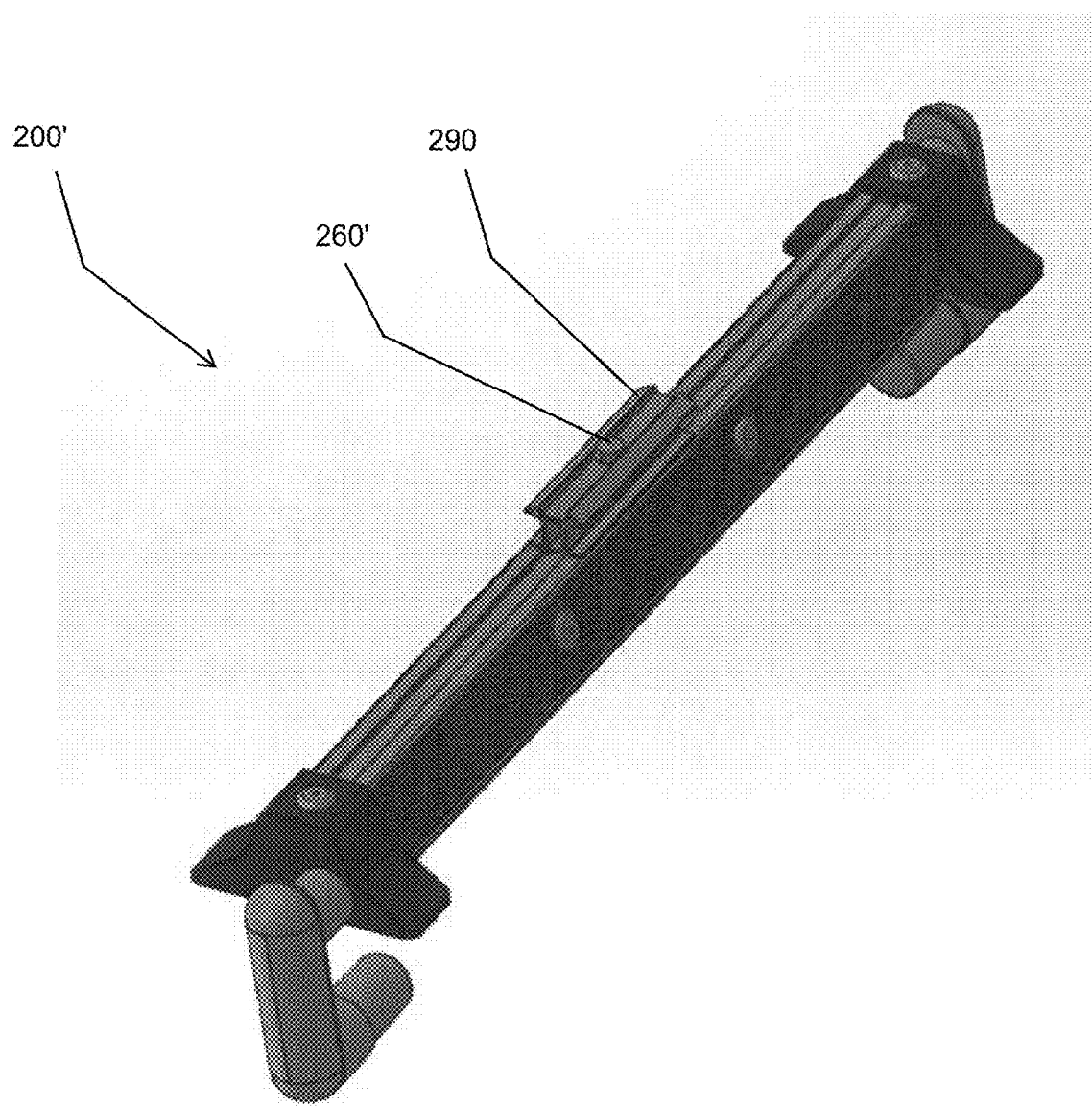
FIG. 16 is another perspective view of a rung lock assembly with a handle according to another embodiment of the invention.
Figure 17:
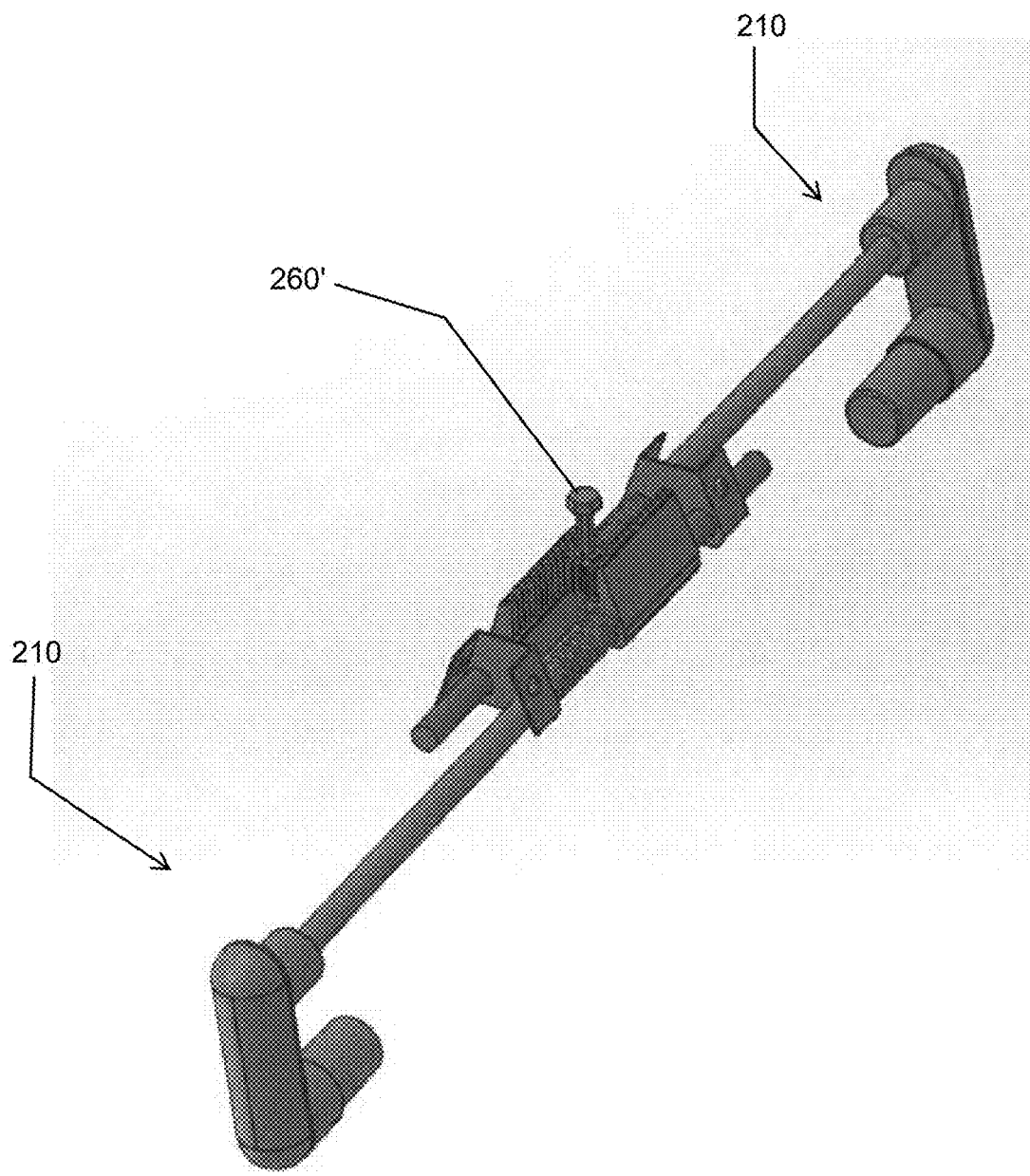
FIG. 17 is a perspective view showing two rung lock portions engaging each other through rack blocks, and pinion gears in FIG. 16.
Figure 18:
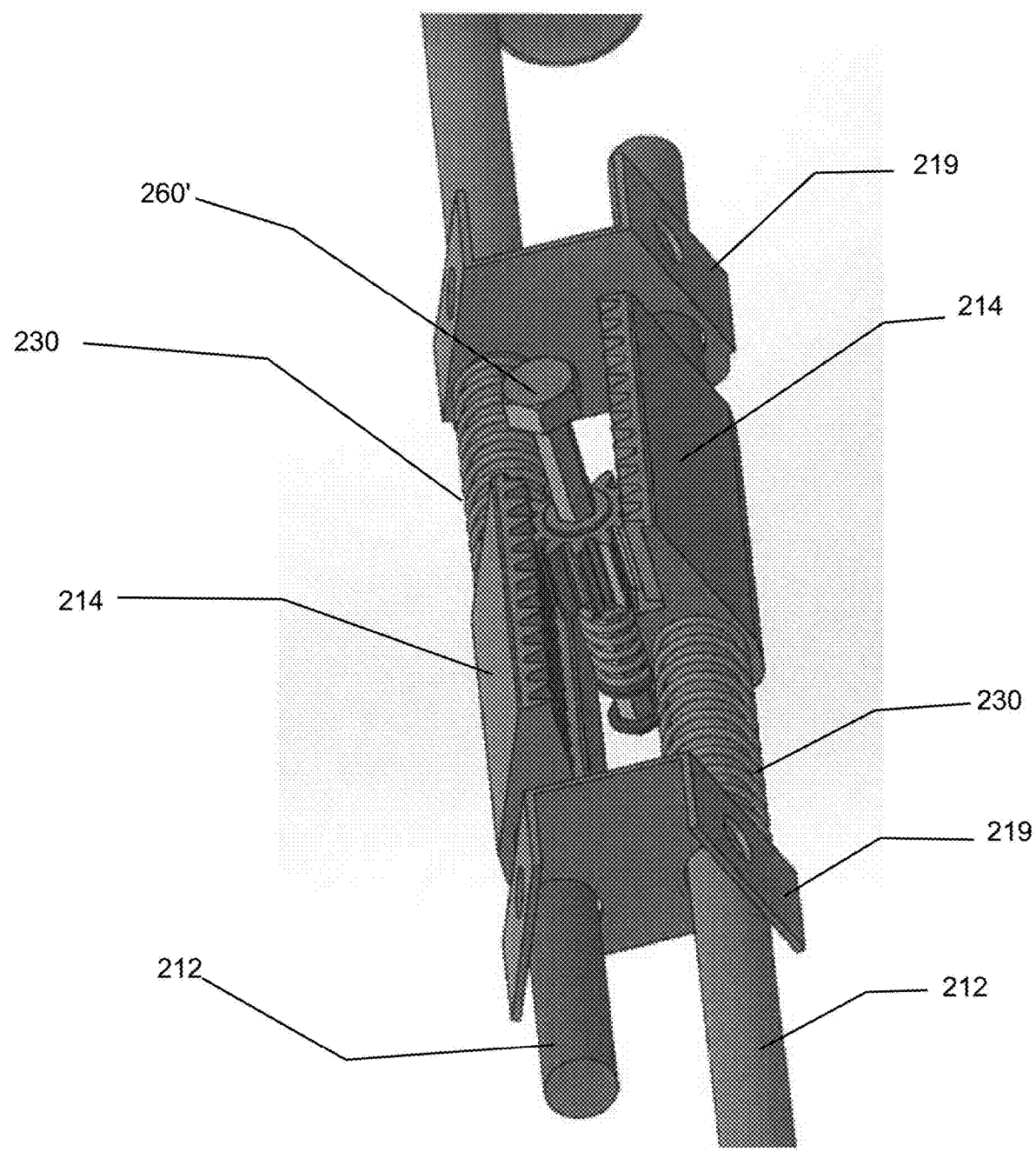
FIG. 18 is an enlarged partial perspective top view of FIG. 17.

The front rung lock assembly (200) is configured so that a distance between the pair of locking portion (216) is increased in both directions simultaneously by pulling one of the holding portions (218) of the pair of rung lock portions (210) as can be seen in FIGS. 13-15.

The holding portion (218) of the rung lock portion (210) may be configured to be twisted about the rod portion (212), so as to facilitate locking and unlocking operations.

Figure 19:
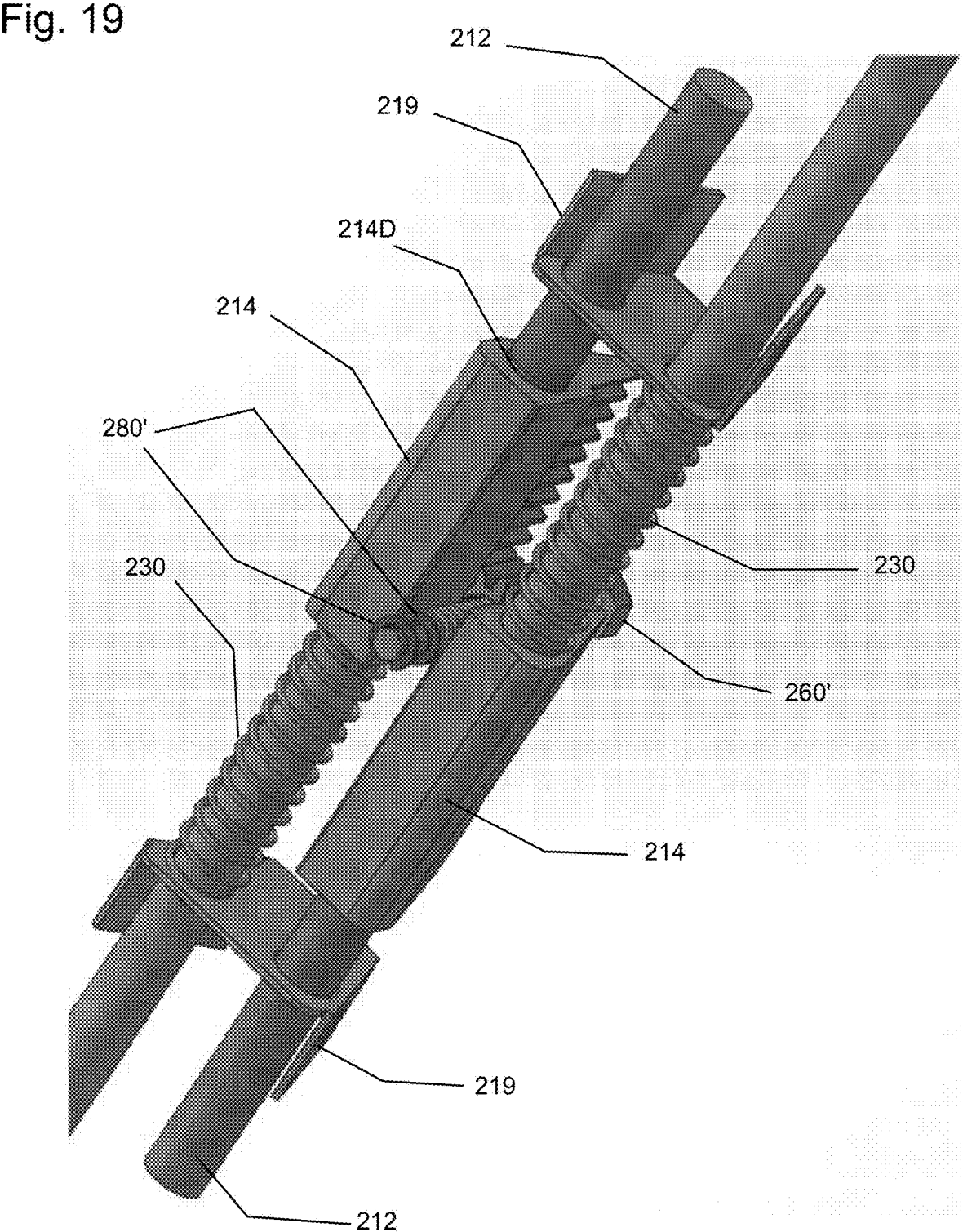
FIG. 19 is an enlarged partial perspective bottom view of FIG. 18.
Figure 33:
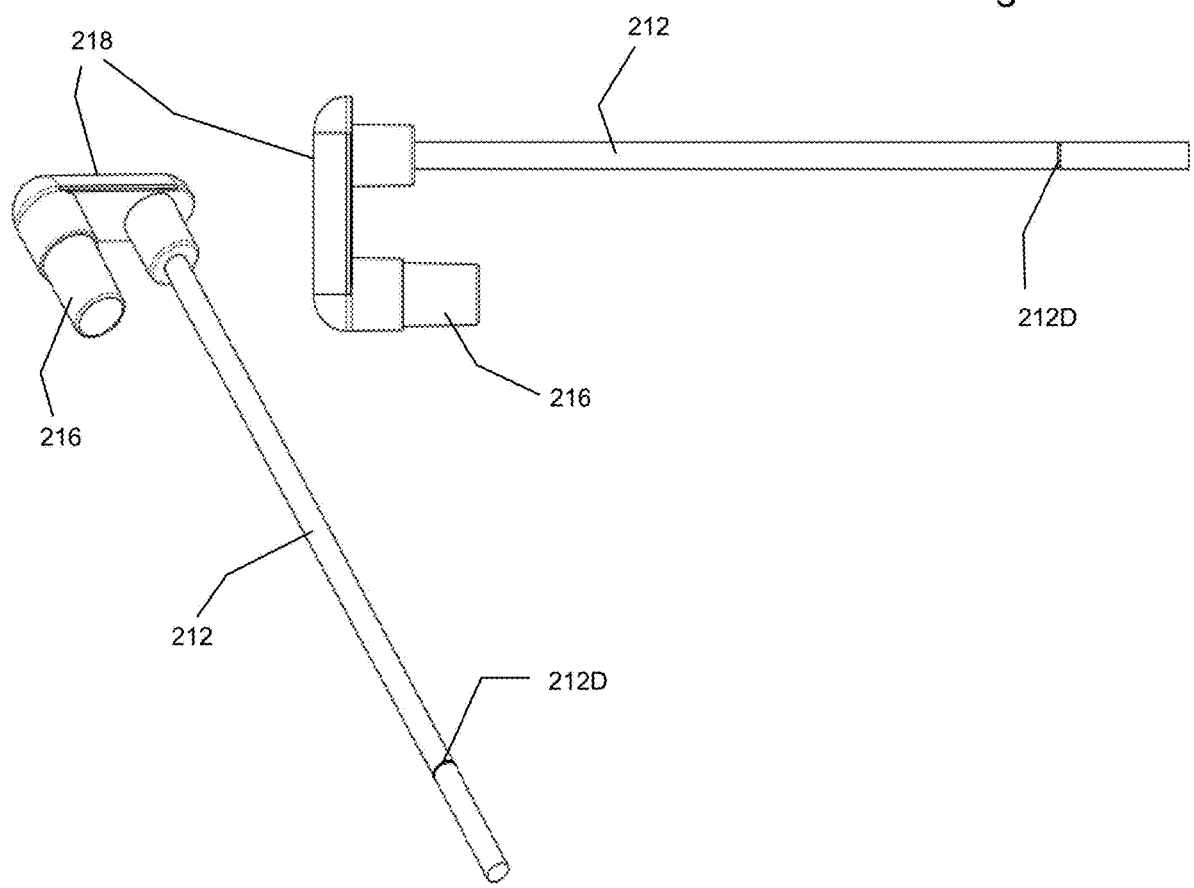
FIG. 33 is a perspective view of the rung lock portion of FIG. 32.

The rung lock portion (210) may be configured to be pulled by a specific distance determined by a distance between the pair of guide plates (219) and distances between each edge of the rack block (214) and the neighboring guide plate (219) as seen in FIG. 19.

Each of the rack blocks (214) may comprise a rack gear portion (214A) and a rod-hole portion (214B) as shown in FIGS. 29-31.

The rack gear portion (214A) may be provided on a top side wall of a base body (214C), and configured to engage with the pinion gear (220), and the rod-hole portion (214B) may be provided through a lower portion in a direction of a train of the rack gear portion (214A), and configured so that the rod portion (212) of the rung lock portion (210) is queued and fixed therethrough as shown in FIGS. 9, 14-15, 29-31.

The rack block (214) may be fixed to the rod portion (212) of the rung lock portion (210) by installing a retaining ring (214D) in a groove (212D) provided at the rod portion (212) as shown in FIGS. 15, 19, 32-33, and 46-47.

The center bolt or the center rivet (260) may comprises a head portion (262), a shaft portion (264), and a fastening portion (266) as shown in FIGS. 38-39.

The shaft portion (264) may extend from the head portion (262) and be configured to be queued and fixed through a center through-hole (222) of the pinion gear (220) as shown in FIG. 9. The center through-hole (222) of the pinion gear (220) may be circular, and the pinion gear is not fixed to the shaft portion (264).

The fastening portion (266) may be provided at an end of the shaft portion (264) and configured to engage the fastener portion (280) as shown in FIGS. 9 and 15.

The shaft portion (264) may have a circular cross-section, and is configured to be queued through the center through-hole (222) of the pinion gear (220), so that the pinion gear (220) rotates about the shaft portion (264), wherein the spacer (270) has a corresponding center through-hole (272) corresponding to the cross-section of the shaft portion (264) as shown in FIGS. 9 and 40-41.

Figure 3:
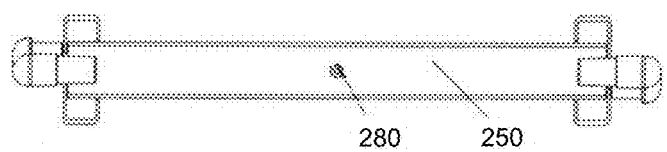
FIG. 3 is a front plan view of FIG. 2.
Figure 4:
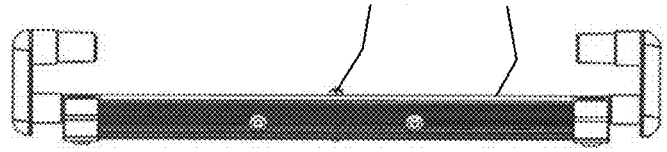
FIG. 4 is a side plan view of FIG. 2.
Figure 5:
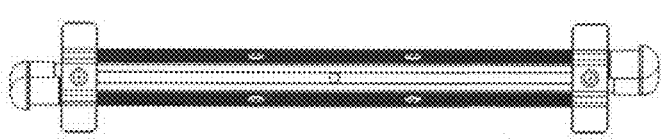
FIG. 5 is a rear plan view of FIG. 2.
Figure 6:
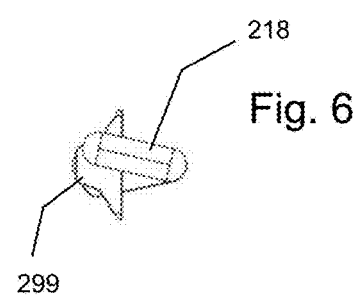
FIG. 6 is another perspective view of FIG. 2.

The fastener portion (280) may comprise a nut configured to engage a fastening portion (266) of the center bolt (260) as shown in FIGS. 3 and 9.

In another embodiment of the invention, the ladder (100) may further comprise a rung lock handle (290) disposed on an exterior wall of the rung body (240) and having a through-hole for the center bolt (260') as shown in FIGS. 10-12, 16-19, and 36-37. The center bolt (260') may have a head portion (262'), a shaft portion (264'), and a fastening portion (266') as shown in FIGS. 36-37.

The shaft portion (264') may have a cross-section of a polygon, and the polygon may comprise hexagon, and the center through-hole (222') of the pinion gear (220') has the same cross-section as the shaft portion (264') so that the shaft portion (264') is queued through the center through-hole (222') and engages the pinion gear (220') so as to rotate together as shown in FIGS. 11-12, 17-19, 26, and 36-37.

Figure 12:
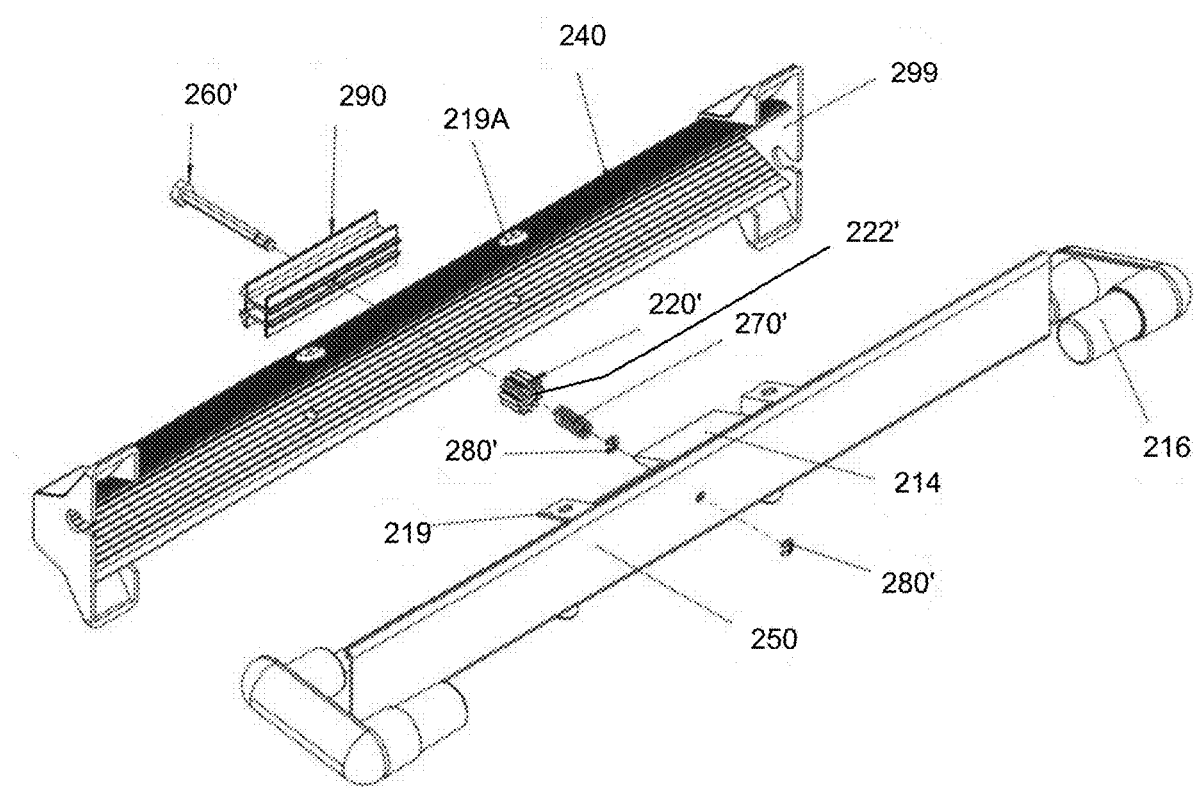
FIG. 12 is an exploded view of the rung lock assembly of FIG. 11.

The spacer (270') may be a spring having a specific length and a specific spring constant, so as to support and maintain the pinion gear (220') in place as shown in FIG. 12.

The pinion gear (220') may further comprise a circular protrusion (224') formed around the center through-hole (222') on a first end portion of the pinion gear (220'), so as to minimize friction of the pinion gear (220') against the rung body (240) as shown in FIGS. 26-28.

The pinion gear may further comprise an axial groove (226') around a part of the center through-hole (222') on a second end portion of the pinion gear (220'), so as to receive one end of the spring (270') as shown in FIGS. 26-28.

The fastener portion (280') may comprise a pair of retention rings disposed on both sides of the rung cover (250) and configured to engage two grooves (268') provided around an end portion of the center bolt (260') as shown in FIGS. 12, 19, and 36-37.

The ladder (100) may further comprise a rear rung lock assembly (200') disposed at telescopic connecting portions provided between the top portions and the bottom portions of the pair of rear side rails, and configured to lock the top portions and the bottom portions through through-holes provided through the telescopic connecting portions as shown in FIG. 1.

The front or rear rung lock assembly (200, 200') may further comprise a pair of rung endcaps (299) disposed at both ends of the rung body (240) as shown in FIG. 7. And, the endcaps may be fixed to the rung body (240) though blind rivets (R) as shown in FIG. 7.

In the illustrated embodiments, the retaining rings (214D, 280') do not have to be of the same size or shape, but they may be varied according to the specific design.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A ladder comprising:
a pair of front side rails comprising top portions and bottom portions, wherein corresponding top and bottom portions are slidably connected in a telescopic manner;
a plurality of front fixed rung portions disposed between the pair of front side rails;
a rung-lock assembly disposed at telescopic connecting portions provided between the top portions and the bottom portions of the pair of front side rails, and configured to lock the top portions and the bottom portions through through-holes provided through the telescopic connecting portions,
wherein the rung-lock assembly comprises:
a pair of rung-lock portions, each of which comprising a rod portion, a rack block fixed to the rod portion, a locking portion, a holding portion connecting the rod portion to the locking portion so that the rod portion is disposed in parallel with the locking portion and configured to be held and pulled by a user's hand, wherein the pair of rung-lock portions are anchored by a pair of guide plates and disposed in parallel with each other;
a pinion gear disposed in between the pair of guide plates, so that the pair of rung-lock portions translate outwards or inwards together;
a pair of compression springs disposed in between the pair of guide plates;
wherein the rung-lock assembly further comprises a pair of rack gear portions disposed in between the pair of guide plates and wherein the pinion gear is placed in between the pair of rack gear portions and its respective compression spring so that the pinion gear engages and rolls over the pair of rack gear portions;
wherein each of the compression springs is facing the respective rack gear portion which is attached to the other compression spring and wherein the pair of compression springs are separated by the pinion par;
wherein the rung-lock assembly is configured so that a distance between the pair of locking portion is increased in both directions simultaneously by pulling one of the holding portions of the pair of rung-lock portions.

2. The ladder of claim 1, wherein the holding portion of the rung-lock portion is configured to be twisted about the respective rod portion.

3. The ladder of claim 1, wherein the rung-lock portion is configured to be pulled to a specific distance determined by a distance between the pair of guide plates.

4. A ladder comprising:
a pair of front side rails comprising top portions and bottom portions, wherein corresponding top and bottom portions are slidably connected in a telescopic manner;
a pair of rear side rails comprising top portions and bottom portions, wherein corresponding top and bottom portions are slidably connected in a telescopic manner;
a plurality of front fixed rung portions disposed between the pair of front side rails;
a plurality of rear fixed rung portions disposed between the pair of rear side rails; and
a rung-lock assembly disposed at telescopic connecting portions provided between the top portions and the bottom portions of the pair of front side rails, and configured to lock the top portions and the bottom portions through through-holes provided through the telescopic connecting portions,
wherein the top portions of the pair of front side rails are rotatably connected with the top portions of the pair of rear side portions through a pair of hinges,
wherein the rung-lock assembly comprises:
a pair of rung-lock portions, each of which comprising a rod portion, a rack block fixed to the rod portion, a locking portion, a holding portion connecting the rod portion to the locking portion so that the rod portion is disposed in parallel with the locking portion and configured to be held and pulled by a user's hand, wherein the pair of rung-lock portions are anchored by a pair of guide plates and disposed in parallel with each other;
a pinion gear disposed in between the pair of guide plates, so that the pair of rung-lock portions translate outwards or inwards together;
a pair of compression springs disposed in between the pair of guide plates;
wherein the rung-lock assembly further comprises a pair of rack gear portions disposed in between the pair of guide plates and wherein the pinion gear is placed in between the each of rack gear portions and its respective compression spring so that the pinion gear engages and rolls over the pair of rack gear portions;

wherein each of the compression springs are facing the respective rack gear portion which is attached to the other compression spring and wherein the pair of compression springs are separated by the pinion gear;

wherein the rung-lock assembly is configured so that a distance between the pair of locking portion is increased in both directions simultaneously by pulling one of the holding portions of the pair of rung-lock portions.

5. The ladder of claim 4, wherein the holding portion of the rung-lock portion is configured to be twisted about the respective rod portion.

6. The ladder of claim 4, wherein the rung-lock portion is configured to be pulled to a specific distance determined by a distance between the pair of guide plates.

* * * * *